United States Patent [19]
Lakshmanan

[11] 3,972,848
[45] Aug. 3, 1976

[54] ADHESIVE COMPOSITION

[75] Inventor: Pallavoor R. Lakshmanan, Allison Park, Pa.

[73] Assignee: Gulf Research & Development Company, Pittsburgh, Pa.

[22] Filed: July 29, 1975

[21] Appl. No.: 599,989

Related U.S. Application Data

[63] Continuation-in-part of Ser. No. 471,467, May 20, 1974, Pat. No. 3,919,160.

[52] U.S. Cl. .................... 260/32.8 A; 260/33.6 A; 260/892; 260/894
[51] Int. Cl.² .......................................... C08K 5/07
[58] Field of Search ............. 260/33.6 A, 892, 894, 260/32.8 A

[56] References Cited
UNITED STATES PATENTS

| | | | |
|---|---|---|---|
| 3,519,585 | 7/1970 | Miller | 260/894 X |
| 3,686,365 | 8/1972 | Sequeira | 260/33.6 A X |

*Primary Examiner*—Lewis T. Jacobs

[57] ABSTRACT

An adhesive composition consisting essentially of a styrene-butadiene radial block copolymer, a styrene-isoprene block copolymer, an isoprene-piperylene copolymer and an organic solvent or mixtures of organic solvents.

12 Claims, No Drawings

ADHESIVE COMPOSITION

This application is a continuation-in-part application of my U.S. Pat. Application Ser. No. 471,467, entitled ADHESIVE COMPOSITION, filed May 20, 1974, now U.S. Pat. No. 3,919,160.

BACKGROUND OF THE INVENTION

1. Field of the Invention

This invention relates to an adhesive composition containing a styrene-butadiene radial block copolymer, a styrene-isoprene block copolymer, an isoprene-piperylene copolymer and an organic solvent or mixtures of organic solvents.

2. Description of the Prior Art

Contact cements having a relatively high tack time that are known today are generally based on polychloroprenes, which require the use of metallic oxides as stabilizers and the use of premilling and prereaction with phenolic resin to provide the desired properties. However, often these oxides have the tendency to settle out of the adhesive, necessitating stirring of the adhesive prior to use. The adhesive herein is capable of performing as a contact cement, however, devoid of any metallic oxide and which requires no premastication or premilling.

SUMMARY OF THE INVENTION

This invention relates to an adhesive composition possessing a relatively high tack time (at least about seven minutes, preferably from about 10 to about 60 minutes) and an excellent dead load hot strength (1000-gram dead load of at least about 95°C., preferably about 110° to about 150°C.), consisting essentially of a styrene-butadiene radial block copolymer, a styrene-isoprene block copolymer, an isoprene-piperylene copolymer and an organic solvent or mixtures of organic solvents.

The styrene-butadiene radial block copolymers present in the adhesive composition of the present invention are composed of styrene and butadiene and have at least three long block copolymer branches radiating from a nucleus. These polymers have the following general configuration:

$$(A - B)_x Y,$$

wherein each terminal A is a styrene polymer, B is a butadiene polymer, Y is a group derived from a polyfunctional compound having at least three reactive sites and $x$ is an integer ranging from 3 to 5, but preferably is 3. The amount of styrene present in the radial block copolymer will range from about five to about 60 weight per cent, preferably from about 10 to about 50 weight per cent, based on the weight of the radial block copolymer, while the amount of butadiene from about 40 to about 95 weight per cent, preferably from about 50 to about 90 weight per cent, based on the weight of the radial block copolymer. The Y group which forms the nucleus from which the polymer blocks radiate is derived from a polyfunctional compound having at least three reactive sites capable of reacting with a carbon-lithium bond. Types of polyfunctional compounds which can be used include the polyepoxides, polyisocyanates, polyimines, polyaldehydes, polyketones, polyanhydrides, polyesters, polyhalides, etc. The styrene-butadiene radial block copolymers used herein can be made in any conventional manner. A particularly attractive procedure for making the same is described in U.S. Patent No. 3,281,383 to Zelinski et al.

The styrene-isoprene block copolymer present in the adhesive composition of the present invention has the following general configuration:

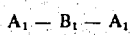

wherein each terminal $A_1$ is a styrene polymer block with a glass transition temperature above about room temperature (26°C.) and which is relatively incompatible with the elastomeric segment $B_1$, defined hereinafter, with the average molecular weight of each A, being from about 2,000 to about 100,000, preferably from about 5,000 to about 50,000. $B_1$ is an isoprene polymer with a glass transition temperature below about room temperature (26°C.), with the average molecular weight of $B_1$ being from about 25,000 to about 1,000,000, preferably from about 50,000 to about 500,000. The difference in glass transition temperature between an end block A, and a center block B, is preferably greater than about 100°C. In the block copolymer used herein the total of the terminal blocks $A_1$ will amount to about eight to about 50 weight per cent, preferably about 10 to about 40 weight per cent, based on the total weight of the block copolymer.

The third component of the adhesive herein is an isoprene-piperylene copolymer. These copolymers can be obtained, for example, by polymerization of a $C_5$ stream of aliphatic petroleum derivatives containing a major proportion of piperylene and isoprene monomers, for example, as in U.S. Pat. No. 3,290,375. Although the stream being polymerized can contain small amounts of higher carbon number monomers, the character of the stream is essentially that attributable to its $C_5$ components. The stream can contain, for example, about 25 weight per cent each of piperylene and isoprene, with the remainder including, for example, tertiary amylenes, tertiary monomers, such as styrene or beta pinene, etc. but the copolymer will be made up mainly of piperylene and isoprene. In general, the melting points of these copolymers are in the range of about 70° to about 130°C.

The last component required herein is an aliphatic, aromatic, ester, ketone or chlorinated solvent or mixtures thereof boiling between about 35° to about 145°C., preferably between about 38° to about 140°C., at atmospheric pressure. Those boiling below the defined range will be released too rapidly from the adhesive composition, causing handling problems, such as insufficient working time, while those boiling above the defined range may require a longer time than normal time for the adhesive to set. Solvents which can be used are aromatics having from six to eight carbon atoms, such as toluene, the xylenes, etc.; aliphatics having from six to eight carbon atoms, such as normal hexane, normal octane, etc., ketones having from two to four carbon atoms, such as methyl ethyl ketone, acetone, etc.; esters having from two to four carbon atoms, such as ethyl acetate, butyl acetate, etc.; chlorinated solvents, such as 1,1,1-trichloroethane, methylene chloride, etc.

The adhesive composition can be prepared in any conventional manner. For example, the ingredients can be added to the solvent in any order, after which mixing can take place until a substantially homogeneous mixture is obtained. Such mixing can be carried out at room temperature and room pressure over a period of about 1 to about 4 hours, or alternatively, the ingredients can be mixed and set aside for about 24 hours during which dissolution of the various adhesive components takes place.

The adhesive composition herein will consist essentially of the following components within the following ranges, assuming the presence of 100 parts by weight of the styrene-butadiene radial component in the final composition:

| Component | Parts By Weight | |
|---|---|---|
| | Broad Range | Preferred Range |
| Styrene-Isoprene Block Copolymer | 5–300 | 20–100 |
| Isoprene-Piperylene Copolymer | 5–300 | 20–100 |
| Solvent | 50–4000 | 200–800 |

If desired, a coumarone-indene resin can be added to the adhesive composition defined above to further improve the dead load hot strength thereof, although the tack time of the adhesive composition, as a result of such addition, will be reduced thereby. If a coumarone-indene resin is added to the adhesive composition, the amount added must be within a range of about five to about 200 weight per cent, preferably about 75 to about 150 weight per cent, based on the isoprene-piperylene copolymer. In addition, an antioxidant, such as 1,3,5-trimethyl-2,4,6-(3,5-ditertiarybutyl-4-hydroxybenzyl)benzene, can be incorporated in the adhesive composition in an amount of about 0.1 to about five weight per cent, based on the weight of the final composition.

The new adhesive composition of this invention is particularly useful in bonding wood, plastic, metal, a cellulosic material, such as paper, glass, etc., to itself or to another member of such group.

DESCRIPTION OF THE PREFERRED EMBODIMENTS

The improved adhesive composition of this invention can be further understood by reference to the following. Compositions were prepared using combinations of a styrene-butadiene radial block copolymer, a styrene-isoprene block copolymer, an isoprene-piperylene copolymer, a coumarone-indene resin, the antioxidants 1,3,5-trimethyl-2,4,6-(3,5-ditertiary-4-hydroxybenzyl)benzene and dilauryl thio dipropionate and a solvent (containing toluene, hexane and acetone in a weight ratio of 1:1:1). Whichever components were used in preparing the compositions were added to the solvent and the resultant composition was mixed for about one to about four hours at atmospheric pressure and atmospheric temperature until a homogeneous composition was obtained. The compositions were then tested for tack time and for their dead load hot strength as follows:

Tack Time: Wet films of the test adhesives were applied to both glass and 50-pound Kraft paper with a 10 mil drawn-down bar. At two-minute intervals ½-inch strips of the coated paper were cut and laid film side down on the coated glass. These strips were applied using moderate finger-tip pressure and were stripped off immediately after they were applied. The time which had elapsed between the initial application of the wet adhesive to the two substrates and the final drying of the adhesive to the point where the coated paper no longer adhered to the coated paper was recorded as tack time.

Dead Load Hot Strength: This test is designed to measure the resistance of an adhesive to flow under a sustained load (creep) at an elevated temperature. A canvas-to-steel shear specimen having a one square inch bonded area was prepared for each test adhesive. In preparing the specimen two coats of adhesive were applied to the canvas and one coat was applied to the steel surface. The coated surfaces were assembled while still tacky and pressed together with a ten-pound roller. The specimens were aged for one week at room temperature before testing. The specimen was tested by suspending it in an oven at 54.5°C. at a constant shear load of 1000 grams. The test assembly consisted of a series of clamps attached to the top of the oven; the steel portions of the specimen was secured by these clamps, and the 1000-gram load was then hooked into slots which were cut into the canvas portions of the specimen. The specimen was clamped in a vertical position so as to maintain a shear load on the adhesive joints. The oven temperature was increased 5.5°C. every 15 minutes until the bond failed or until a temperature of 150°C. was reached. The temperature at failure was recorded as the dead load hot strength.

The data obtained are tabulated below in Tables I, II and III.

TABLE I

| Run Number | I | II | III | IV | V |
|---|---|---|---|---|---|
| Solprene 406, Grams | 100 | 100 | 100 | 100 | 100 |
| Kraton 1107, Grams | 20 | 20 | None | 20 | 20 |
| Cumar LX-509, Grams | None | 37.5 | 37.5 | 37.5 | 56.25 |
| Sta-tac 100, Grams | 37.5 | None | 37.5 | 37.5 | 37.5 |
| 1,3,5-trimethyl-2,4,6 (3,5-ditertiary-4-hydroxybenzyl)benzene, Grams | 0.5 | 0.5 | 0.5 | 0.5 | 0.5 |
| Dilauryl Thio Dipropionate, Grams | 0.5 | 0.5 | 0.5 | 0.5 | 0.5 |
| Solvent (Toluene, Hexane, Acetone, 1:1:1 Weight Ratio), Grams | 475 | 475 | 528 | 588 | 644 |
| Results | | | | | |
| Tack Time, minutes | 12 | 6 | 6 | 8 | 10 |
| Dead Load Hot Strength, °C. | 104 | 138 | 126 | 110 | 115 |

TABLE II

| Run Number | VI | VII | VIII | IX | X |
|---|---|---|---|---|---|
| Solprene 411, Grams | 100 | 100 | 100 | 100 | 100 |
| Kraton 1107, Grams | 20 | 20 | None | 20 | 20 |
| Cumar LX-509, Grams | None | 37.5 | 37.5 | 37.5 | 56.25 |
| Sta-tac 100, Grams | 37.5 | None | 37.5 | 37.5 | 37.5 |
| 1,3,5-trimethyl-2,4,6 (3,5-ditertiary-4-hydroxybenzyl)benzene, Grams | 0.5 | 0.5 | 0.5 | 0.5 | 0.5 |
| Dilauryl Thio Dipropionate, Grams | 0.5 | 0.5 | 0.5 | 0.5 | 0.5 |
| Solvent (Toluene, Hexane, Acetone, 1:1:1 Weight Ratio), Grams | 475 | 475 | 528 | 588 | 644 |
| Results | | | | | |
| Tack Time, minutes | 22 | 6 | 6 | 16 | 12 |
| Dead Load Hot Strenth, °C. | 99 | 143 | 121 | 121 | 115 |

TABLE III

| Run Number | XI | XII |
|---|---|---|
| Solprene 411, Grams | 100 | 100 |
| Kraton 1107, Grams | 20 | 20 |
| Cumar LX-509, Grams | 37.5 | 56.25 |
| Sta-tac 100, Grams | 37.5 | 37.5 |

TABLE III-continued

| | | |
|---|---|---|
| 1,3,5-trimethyl-2,4,6 (3,5-ditertiary-4-hydroxybenzyl)benzene, Grams | 0.5 | 0.5 |
| Dilauryl Thio Dipropionate, Grams | 0.5 | 0.5 |
| 1,1,1 Trichloroethane, Grams | 588 | 644 |
| Results | | |
| Tack Time, minutes | 22 | 16 |
| Dead Load Hot Strength, °C. | 118 | 118 |

Referring to the components used in the adhesive compositions above, Solprene 406 is a styrene-butadiene radial block copolymer made and sold by Phillips Petroleum Company and has a molecular weight of about 250,000 and a butadiene to styrene weight ratio of about 60/40. Solprene 411 is a similar radial block copolymer of styrene and butadiene, with a molecular weight of about 300,000 and a butadiene to styrene weight ratio of about 70/30. Kraton 1107 is a styrene-isoprene block copolymer made and sold by Shell Chemicals wherein the terminal styrene block has a molecular weight of about 2,000 to about 100,000 and the center isoprene block has a molecular weight of about 25,000 to about 1,000,000 with the styrene block constituting about 15 per cent by weight of the total block. Cumar LX-509 is a coumarone-indene resin made and sold by Neville Chemicals Company having a melting point of 155°C. and Sta-tac 100 is an isoprene-piperylene copolymer made and sold by Rheichold Chemicals, Inc. having a melting point of 105°C.

The data in the above Tables illustrate the effectiveness of the improved adhesive compositions of the present invention. Note in Table I that the improved composition must contain a styrene-butadiene radial block copolymer, a styrene-isoprene block copolymer, an isoprene-piperylene copolymer and a solvent. In Runs Nos. II and III where an isoprene-piperylene copolymer or a styrene-isoprene block copolymer, respectively, were not present, a tack time of less than seven minutes was obtained. In Run No. I wherein all of the necessary components were present, the tack time was higher. The addition of a coumarone-indene resin to the desired composition of Run No. IV reduced the tack time but increased the dead load strength obtained in Run No. I. That a coumarone-indene resin, when added to the composition herein in selected amounts, will further increase the dead load hot strength of the composition, is apparent from the data in Run No. V. The utilization of another styrene-butadiene radial block copolymer in Table II and of another solvent in Table III resulted in compositions having characteristics similar to those obtained in Table I.

Obviously, many modifications and variations of the invention, as hereinabove set forth, can be made without departing from the spirit and scope thereof and, therefore, only such limitations should be imposed as are indicated in the appended claims.

I claim:

1. An adhesive composition consisting essentially of a styrene-butadiene radial block copolymer, a styrene-isoprene block copolymer, an isoprene-piperylene copolymer and an organic solvent wherein the components are present in the following ranges, assuming the presence of 100 parts by weight of the styrene-butadiene radial block copolymer in the final composition:

| Component | Parts by Weight |
|---|---|
| Styrene-Isoprene Block Copolymer | 5–300 |
| Isoprene-Piperylene Copolymer | 5–300 |
| Solvent | 50–4,000 |

, wherein the styrene-butadiene radial block copolymer has the following general configuration:

$$(A - B)_x Y,$$

with A being a styrene polymer, B a butadiene polymer, Y a group derived from a polyfunctional compound having at least three reactive sites and $x$ is an integer ranging from three to five; the styrene-isoprene block copolymer has the following general configuration:

$$A_1 - B_1 - A_1,$$

wherein $A_1$ is a styrene polymer block having an average molecular weight of about 2000 to about 100,000 and $B_1$ is an isoprene polymer block having an average molecular weight of 25,000 to about 1,000,000; and the melting points of the isoprene-piperylene copolymer being in the range of about 70° to about 130°C.

2. The composition of claim 1 wherein the components are present in the following ranges, assuming the presence of 100 parts by weight of the styrene-butadiene radial block copolymer in the final composition:

| Component | Parts By Weight |
|---|---|
| Styrene-Isoprene Block Copolymer | 20–100 |
| Isoprene-Piperylene Copolymer | 20–100 |
| Solvent | 200–800. |

3. The composition of claim 1 wherein the styrene polymer will range from about five to about 60 weight per cent, based on the weight of the radial block copolymer.

4. The composition of claim 1 wherein the styrene polymer will range from about 10 to about 50 weight per cent, based on the weight of the radial block copolymer.

5. The composition of claim 1 wherein the styrene polymer block has an average molecular weight of about 5,000 to about 50,000 and the isoprene polymer block has an average molecular weight of about 50,000 to about 500,000.

6. The composition of claim 1 wherein the total of the terminal blocks $A_1$ amount to about eight to about 50 weight per cent of the block copolymer.

7. The composition of claim 1 wherein the total of the terminal blocks $A_1$ amount to about 10 to about 40 weight per cent of the block copolymer.

8. The composition of claim 1 wherein the solvent is toluene.

9. The composition of claim 1 wherein the solvent is hexane.

10. The composition of claim 1 wherein the solvent is acetone.

11. The composition of claim 1 wherein additionally there is present a coumarone-indene resin in an amount within the range of about 5 to about 200 weight per cent based on the isoprene-piperylene copolymer.

12. The composition of claim 1 wherein additionally there is present a coumarone-indene resin in an amount within the range about 75 to about 150 weight per cent based on the isoprene-piperylene copolymer.

* * * * *